United States Patent
Steward

[15] 3,661,038
[45] May 9, 1972

[54] SAW SWAGE TOOL

[72] Inventor: Lexie L. Steward, Box 20, Randolph, Miss. 38864

[22] Filed: June 17, 1970

[21] Appl. No.: 46,965

[52] U.S. Cl. ................................................76/72
[51] Int. Cl. ...........................................B23d 63/04
[58] Field of Search ...............................76/66, 72

[56] References Cited

UNITED STATES PATENTS

| | | | |
|---|---|---|---|
| 254,715 | 3/1882 | Smith | 76/72 |
| 593,574 | 11/1897 | French | 76/72 |
| 1,631,534 | 6/1927 | Johnson | 76/72 |

*Primary Examiner*—Bernard Stickney

[57] ABSTRACT

A device of improved structure for the perfection of saw teeth. The device includes a body member which receives a non-expansive band, the structure being used on inserted saw teeth as used by saw mills.

1 Claim, 4 Drawing Figures

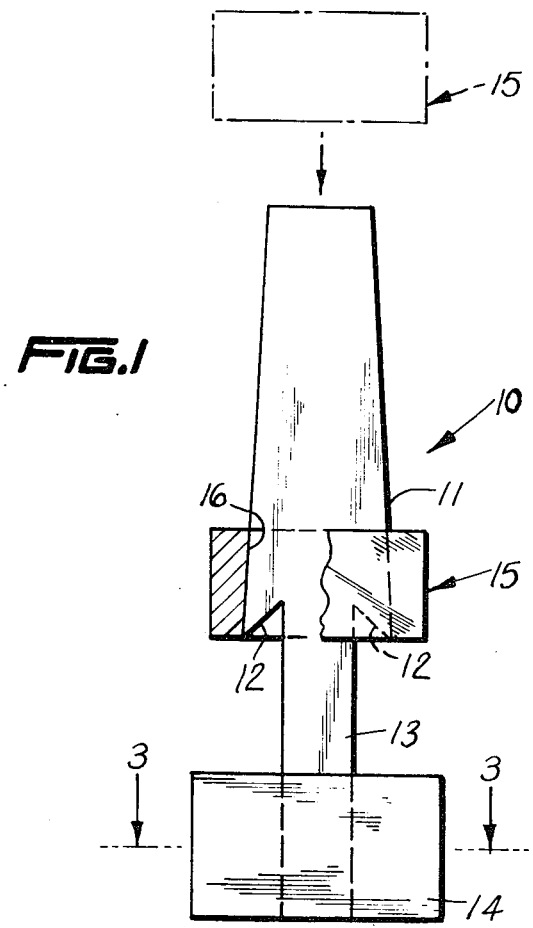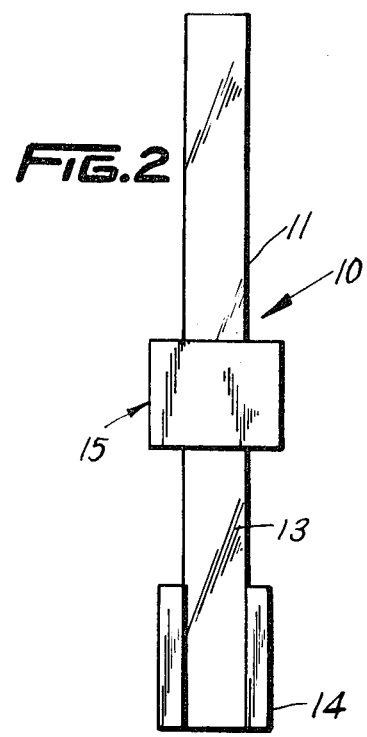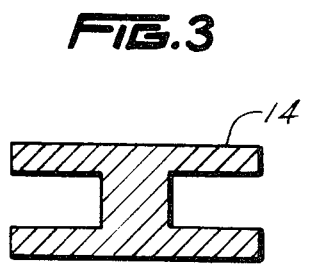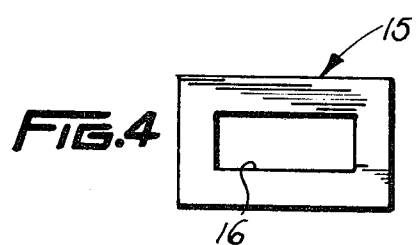
INVENTOR.
LEXIE L. STEWARD

SAW SWAGE TOOL

This invention relates to swage devices, and more particularly to a saw swage tool.

It is therefore the primary purpose of this invention to provide a saw swage tool which will be used by saw mills on saws that have inserted teeth.

Another object of this invention is to provide a saw swage tool whichwill be a definite improvement over the ones of the prior art in that it provides a perfect set within itself and thereby takes the guesswork out of perfecting the saw teeth. The structure therefore is such that an amateur may use it.

Other objects of the invention are to provide a saw swage tool which is simple in design, inexpensive to manufacture, rugged in construction, easy to use and efficient in operation.

These and other objects will be readily evident upon a study of the following specification and the accompanying drawing wherein:

FIG. 1 is a vertical view of the present invention shown in elevation with the removed position of the non-expansive band shown in phantom lines;

FIG. 2 is a side view of FIG. 1;

FIG. 3 is a cross sectional view taken along the lines 3—3 of FIG. 1; and

FIG. 4 is a top plan view of the non-expensive band member shown removed from FIG. 1.

According to this invention, a saw swage tool 10 is shown to include a tapered main body 11 having toothed portions 12 adjacent to the central stem 13, the stem 13 extending from the base 14. Non-expansive band 15 of rectangular configuration receives the main body 11 within its tapered opening 16 as shown in FIG. 1 of the drawing.

The purpose of tool 10 being tapered is for expanding the cutting edge of the saw teeth, the square side being for the purpose of truing or levelling.

I claim:

1. A saw swage tool for use by saw mills on inserted saw teeth, comprising in combination a main body tapered toward one end, the opposite end being provided with toothed spurs on opposite edges, a stem having one end between said spurs and being integral with said main body, said stem comprising a straight, elongated element which at its opposite end extending into a base; and a non-expansive band of rectangular shape having a tapered central opening for being fitted on said tapered main body, said band fitting around said toothed spurs, an edge of said band being aligned with a pointed end of said spurs; said tool being used to expand the cutting edge of insertable saw teeth, thus insuring a perfect set of said teeth, said tool thus serving as a die for perfecting said saw teeth.

* * * * *